United States Patent [19]

Harrell et al.

[11] Patent Number: 4,839,412

[45] Date of Patent: Jun. 13, 1989

[54] ETHYLENE COPOLYMER COMPOSITIONS

[75] Inventors: Jerald R. Harrell; Lawrence C. Muschiatti, both of Wilmington, Del.

[73] Assignee: E. I. Du Pont De Nemours and Company, Wilmington, Del.

[21] Appl. No.: 93,561

[22] Filed: Sep. 1, 1987

Related U.S. Application Data

[63] Continuation-in-part of Ser. No. 935,708, Nov. 25, 1986, abandoned.

[51] Int. Cl.$^4$ ............................................... C08K 3/10
[52] U.S. Cl. ....................................... 524/436; 524/437; 525/74
[58] Field of Search .................. 524/436, 437; 525/74

[56] References Cited

U.S. PATENT DOCUMENTS 4,687,810  8/1987  Coran ................................. 525/74

FOREIGN PATENT DOCUMENTS

| 131358 | 5/1983 | European Pat. Off. | 525/74 |
| 0207734 | 6/1986 | European Pat. Off. | |
| 0013718 | 1/1980 | Japan | 525/74 |
| 0002358 | 1/1983 | Japan | 525/74 |
| 0184237 | 5/1983 | Japan | 525/74 |

Primary Examiner—Joseph L. Schofer
Assistant Examiner—Peter D. Mulcahy

[57] ABSTRACT

Certain ethylene copolymers that contain an ethylene-/anhydride graft copolymer and a magnesium hydroxide or aluminum trihydrate flame and smoke retardant have a good balance of strength and flame and smoke retardant properties. The compositions preferably also contain polyethylene, and/or ionomeric ethylene copolymer and/or an ethylene/propylene elastomer.

6 Claims, No Drawings

ETHYLENE COPOLYMER COMPOSITIONS

CROSS-REFERENCE TO RELATED APPLICATION

This application is a continuation-in-part of application Ser. No. 935,708, filed Nov. 25, 1986, now abandoned.

BACKGROUND OF THE INVENTION

Ethylene polymers, i.e., homopolymers and copolymers, are easily molded or extruded into shaped articles. Additives are frequently used to improve the strength of the polymers. Efforts have also been made to improve the flame and smoke resistance of such polymers by adding various flame and smoke retardants. However, many such retardants have a negative effect on mechanical properties, such as strength properties, and it is desirable to discover combinations of strength-enhancing additives and flame and smoke retardants that provide a good balance between strength properties and flame and smoke retardancy. This invention is directed to such combinations.

SUMMARY OF THE INVENTION

In its broad aspect, the compositions of this invention comprise:
(a) 20-100 parts of an ethylene polymer matrix comprising at least one thermoplastic ethylene copolymer of ethylene and at least one comonomer selected from vinyl acetate, esters of methacrylic acid or esters of acrylic acid;
(b) 10-80 parts, preferably 10-40 parts, of a copolymer selected from the class consisting of (i) an ethylene/propylene/diene copolymer grafted with 0.1 to 5 weight % anhydride functionality or (ii) at least one polyolefin grafted with 0.1 to 5 weight % anhydride functionality, or (iii) a mixture of both; and
(c) 75-130 parts, preferably 90-110, per 100 parts of polymeric components present, of magnesium hydroxide or alumina trihydrate, or a mixture of both.
(d) 0-80 parts of polyethylene, preferably medium density or linear low density polyethylene;
provided that the combined parts of components (a) and (d) is at least 80 parts.

When polyethylene is present, the preferred amount of component (a) present will be 30-40 parts.

In another embodiment, 3-20 parts of at least one ionomeric copolymer of ethylene and at least one alpha,beta-ethylenically unsaturated carboxylic acid of 3-6 carbons, such as methacrylic or acrylic acid can be present with components (a)-(c) or with components (a)-(c) that contain polyethylene.

Still another optional feature in any of the foregoing embodiments is the additional presence of an ethylene/propylene or ethylene/propylene/diene copolymer in amounts of up to 50 parts.

In still other embodiments, any one or more of the following copolymers may be present: a copolymer of ethylene/methacrylic or acrylic acid, a copolymer of ethylene/vinyl acetate grafted with anhydride functionality, a copolymer of ethylene and acrylic or methacylic acid esters of saturated aliphic alcohols grafted with anhydride functionality.

To add flame retardancy, magnesium hydroxide or alumina trihydrate, or a mixture of the two, is added.

To reduce low temperature brittleness, an ethylene/propylene/diene copolymer grafted with anhydride functionality or at least one polyolefin grafted with anhydride functionality, or a mixture of both, is added.

In addition, it was also found that an ionomeric copolymer of ethylene and a lower alkyl (meth)acrylic acid neutralized with metallic cations also provides resistance to low temperature brittleness, and these polymers can be used also.

It was also discovered that if an ethylene/propylene rubbery copolymer or ethylene/propylene/diene copolymer is added, the elongation properties of the compositions are enhanced.

DESCRIPTION OF THE INVENTION

The foregoing compositions are useful as flame retardant articles, or as insulation or protective coatings around electrical wire or cable.

The thermoplastic ethylene copolymer matrix has been found to more readily accept the magnesium hydroxide or alumina hydrate because of its polarity, and improves extrudability of the compositions. The ethylene copolymers are preferably copolymers of ethylene and vinyl acetate, but numerous other monomers may be used in place of vinyl acetate. For example, copolymers of ethylene with acrylic, methacrylic or methacrylic acid esters of saturated aliphatic alcohols can be used. The copolymers of ethylene and esters of acrylic acid and methanol or ethanol advantageously have a comonomer content of 9-49 wt. %.

It has been found that, preferably, polyethylene should be a component, and that preferably use of a medium density (i.e., maximum density 0.940 (ASTM D-1248, Type II)) polyethylene or linear low density polyethylene (maximum density 0.925) and use of a narrow molecular weight range polyethylene produces better mechanical properties in a wire or cable coating. Such polyethylenes are preferred.

The grafted polymers of component b may be grafted with alpha,beta-ethylenically unsaturated carboxylic acids or anhydrides such as maleic acid, maleic anhydride, fumaric acid, itaconic acid, itaconic anhydride, and the like. Maleic anhydride is a preferred graft material for both the polyolefin polymers and the ethylene/propylene/diene (EPDM) copolymer. The amount of grafting, i.e., anhydride functionality, will be about 0.1 to 5 weight %. The grafted copolymers impart good resistance to low temperature (e.g., about −40° or below, such as down to −60° C.) brittleness. They also increase yield elongation, and yield and break tensile strength. The polyolefin polymers can be polyethylene or copolymers of ethylene and higher olefins ($C_3$–$C_6$) such as propylene and/or butylene. Thus, they include both crystalline and elastomeric polymers, and can be employed with one another herein.

By the term "anhydride functionality" is meant the group

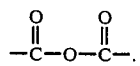

The concentration of anhydride in the graft polymer may be measured by infrared spectroscopy of hot pressed films.

The graft copolymers may be prepared as described in Flexman, U.S. Pat. No. 4,026,067 or Caywood, U.S. Pat. No. 3,884,882 and U.S. Pat. No. 4,010,223. The diene component of the graft copolymer is nonconjugated and includes linear aliphatic dienes of at least six carbon atoms which have one terminal double bond and one internal double bond, and cyclic dienes wherein one or both of the carbon-to-carbon double bonds are part of a carbocyclic ring. Of the linear dienes, 1,4-hexadiene are especially preferred.

Classes of cyclic dienes useful for graft formation include alkylidene bicycloalkenes, alkenyl bicycloalkenes, bicycloalkadienes, and alkenyl cycloalkenes.

The magnesium hydroxide [$Mg(OH)_2$] and alumina trihydrate ($Al_2O_3.3H_2O$) are used to impart smoke and flame retardation to the compositions. These materials may be surface treated to aid in compatibilizing them with the matrix polymer or polymers.

It has also been found that presence of an ethylenic ionomeric copolymer also aids in reducing brittleness at low temperatures. The ionomeric copolymer employed as a component of the blends of this invention is preferably a copolymer of ethylene and alpha,beta-ethylenically unsaturated carboxylic acids containing 3-6 carbon atoms. The alpha-olefin content of the copolymer is preferably at least 70 mole percent, based on copolymer. The carboxylic acid groups are randomly distributed over the copolymer molecules and can be 10-90%, preferably 40-80%, neutralized by metal cations distributed over the carboxylic acid groups of the copolymer. The metal cations can be derived from any metals, but preferably are Zn, Na, Mg or Ca. Illustrative of the alpha,beta-ethylenically unsaturated carboxylic acids useful in the preparation of said ionic copolymer are acrylic acid, methacrylic acid, ethacrylic acid, itaconic acid, maleic acid, fumaric acid, and monoesters of itaconic acid, maleic acid, and fumaric acid. Other monomers can, of course, be incorporated in the copolymer.

Finally, it has been found that if an ethylene/propylene (E/P) copolymer or ethylene/propylene/diene (EPDM) copolymer is added, the composition will have better elongation properties. Examples of EPDM copolymers are those ungrafted copolymers described previously.

Desired additives such as antioxidants, neutralizers, ultraviolet absorbers, antistatic agents, pigments, lubricants, slip agents, viscosity modifiers or the like can be added to the composition of this invention.

The components of the compositions of this invention can be blended by any of the conventional blending methods such as a roll mill, a Banbury mixer, a monoaxial extruder, biaxial extruder or the like. The compositions can be formed by any of the conventional methods such as compression molding, extrusion coating, injection molding, calendering, or the like.

EXAMPLES

The Examples are shown in tabular form. The blends described in the tables were prepared by blending the indicated ingredients on a Banbury mixer or two-roll mill. Compounding on a two-mill roll was carried out on a 4"×8" (10.2 cm×20.3 cm) two-roll mill heated with 165° C. steam. All of the polymer components were added to the mill, melted and mixed. Flame retardants and other additives were then added. When incorporation was complete and a band formed on the mill, the component was cut and folded six times. After cigar rolling and rebanding six times, the compound was sheeted off the mill. Compression molding of these samples was carried out on a 8"×8" (20.3 cm×20.3 cm) stainless steel mold. The bottom plate containing two 3"×6"×0.075 (7.6 cm×15.2 cm×0.2 cm) cavities was ¾" (1.9 cm) thick; the solid top plate was ⅜" (0.95 cm) thick. The mold was heated to 177° C. in a Pasedena Hydraulic Press. 7.6 cm×15.2 cm×0.23 cm sheets of compound were placed in the preheated mold, using 2 mil "Kapton" polyimide film sprayed with Freekote 33 mold release as a mold liner. The closed mold was placed in the press and heated for 10 minutes with the platens closed to touch pressure. The pressure was then increased to 30,000 pounds force on the 10.2 cm ram as read from the pressure gauge of the press for 1 minute. The pressure was momentarily released and then returned to 30,000 pounds (133 kN) force for 2 minutes. The closed mold was then removed from the heated press and placed in a water-cooled press. When the mold reached room temperature, the samples were removed from the mold.

When a Banbury mixer was used, the chamber was heated to 150°-160° F. (66°-71° C.) with the cooling water off. The polymers and then flame retardants were added. Mixing to 250° F.-275° F. (166°-177° C.) with the cooling water off was carried out, followed by sweeping. The cooling water was turned on after sweeping.

With the cooling water on, mixing was carried out until a temperature of 330°-350° F. was reached and then the contents were dumped from the chamber. The contents were cut and folded on a mill and sheeted for molding. The sheeted compositions were pressed between sheets of "Mylar" or aluminum foil. Mold temperatures of 177° C. (350° F.) were used. The contents were held at contact pressure for 10 minutes. The contents were held at full pressure for 1 minute; the pressure was momentarily released then quickly reestablished and held for an additional two minutes. The sheet was removed and cooled quickly on a cold bench top.

Each example and comparison in the Tables consists of 100 parts by weight matrix polymer. This matrix polymer consists of an ethylene copolymer, as indicated, at 20-100 parts, and polyethylene, 0-80 parts. Varying amounts of other ingredients were added, expressed as parts per 100 parts of the above resin ingredients.

Samples for testing were compression molded according to the procedure outlined above and tests performed according to the procedures outlined in the Table below.

Where blanks appear in the Table property data, the property value was not determined.

| Table of Test Methods | |
|---|---|
| Test | Procedure |
| Yield Strength | ASTM D-638, D-412 |
| Elongation at Yield | ASTM D-638, D-412 |
| Tensile Strength | ASTM D-638, D-412 |
| Elongation at Break | ASTM D-638, D-412 |
| Low Temp. Brittleness (LTB) | ASTM D-746 |
| Limiting Oxygen Index (LOI)* | ASTM D-862 |

*Measured to nearest 1%.

| TABLE OF COMPOSITION | |
|---|---|
| EVA 1 | 28 wt. % VA, MI 3 |
| EVA 2 | 18 wt. % VA, MI 0.7 |
| EVA 3 | 9.5 wt. % VA, MI 0.8 |
| EEA | 15 wt. % ethyl acrylate, MI 0.5 |
| E/nBA | 30 wt. % n-butyl acrylate |

TABLE OF COMPOSITION (continued)

| | |
|---|---|
| HDPE | high density polyethylene |
| MDPE | medium density polyethylene (Type II, ASTM D-1248) |
| LLDPE | linear low density polyethylene (Type I, ASTM D-1248) |
| Graft Copolymer 1 | Graft of maleic anhydride (about 1.7 wt. %) onto EPDM rubber, MI about 3 |
| Graft Copolymer 2 | Graft of maleic anhydride (about 0.4 wt. %) onto polyethylene, MI about 13 |
| Graft Copolymer 3 | Graft of maleic anhydride (about 1.0 wt. %) onto polyethylene, MI about 12 |
| Ionomer 1 | Copolymer of ethylene with 15 wt. % methacrylic acid, 58% neutralized with zinc, MI 0.7 |
| Ionomer 2 | Copolymer of ethylene with 10 wt. % isobutyl acrylate and 10 wt. % methacrylic acid, 74% neutralized with Zn, MI 1.0 |
| EPDM 1 | Terpolymer of ethylene with 30 wt. % propylene and 3.7% hexadiene, Mooney viscosity, about 44, ASTM D-16467 |
| EPDM 2 | Same as EPDM 1, except Mooney viscosity is about 60 |
| Melamine Resin | "Cyrez" 963 from American Cyanamid Company |
| Antioxidant | "Irganox" 1010, which is from Ciba Geigy |

EVA = ethylene/vinyl acetate copolymer
MI = melt index
EEA = ethylene/ethyl acrylate copolymer
E/nBA = ethylene/n-butyl acrylate copolymer
EPDM rubber = ethylene/propylene/1,4-hexadiene copolymer Examples 1 and 2 and Comparative Examples C1 to C4, Table 1, show that when EVA, LLDPE, graft copolymer, and $Mg(OH)_2$ are present, the same exhibits superior LOI (at 125 parts $Mg(OH)_2$) to samples in which any of these components is missing. At higher $Mg(OH)_2$ levels, as shown in Examples 3 and 4, Table 2, better than expected LOI's are obtained even in the absence of the polyethylene. The letter L before the LOI value means "less than". Other properties are good, as seen in the Table.

Examples 5–9, Table 3, show that EVA containing 28 wt. % VA is superior to EVA containing only 18% or 9.5% VA. The EVA of higher vinyl acetate content gives compositions with generally higher elongation at break, when compared with the corresponding examples at lower VA levels. The EVA's of lower VA content still give acceptable properties for purposes of this invention.

Examples 10–13, Table 4, show that the presence of some polyethylene based graft copolymer gives significantly improved elongation at break compared to samples which use only the graft copolymer based on ethylene/propylene/diene rubber, at the same total levels of graft copolymer. In these preferred cases, the properties are even further improved when the polyethylene is LLDPE rather than MDPE Examples 14–17, Table 5, show the advantage of replacing part of the graft copolymer with ethylene/-propylene/diene rubber. While Example 14 already shows an excellent balance of properties, replacing progressively more and more of the graft copolymer with EPDM rubber results in still improved elongation, while maintaining tensile strength, and with only slight deterioration of low temperature properties. However, when high levels of EPDM rubber are added, at the expense of graft copolymer Examples 18 and 19 and Comparative Example C5, low temperature properties are compromised. Example 20, however, shows that at 10 parts graft copolymer, adequate low temperature properties can be obtained, provided that the amount of EPDM rubber is limited to about 10 parts.

Examples 21–29, Table 6, further illustrate the invention with compositions of EVA or EEA, LLDPE or MDPE, graft copolymer, and magnesium hydroxide or alumina trihydrate flame retardant. All samples give an acceptable spectrum of properties.

Examples 30–40, Table 7, further illustrate the invention with compositions which also include EPDM rubber.

Examples 41–47, Table 8, and Examples 48–54, Table 9, are similar to the examples in Tables 7 and 6, respectively, except that a small amount of ionomeric copolymer is also present. Examples 52–54 show the effect of adding ionomeric copolymer in increasing amounts. It is apparent from these examples that the presence of the ionomeric copolymer tends to give improved low temperature properties and tensile strength.

Comparative Examples C6 through C9, in Table 10, show that when the graft copolymer is left out of the composition, the elongation properties are greatly reduced. If EPDM rubber is present Comparative Examples C8 and C9, the elongation may be improved somewhat, but the low temperature properties are not improved.

Comparative Examples C-10 to C-12, Table 11, and C-3 and C-4, Table 1, show that when the ethylene copolymer is absent, the balance of properties is not maximized. (In Examples C-10 to C-12, the amount of copolymer plus polyethylene is less than 100 parts. The amounts of other ingredients have not been normalized.)

The Tables follow.

TABLE 1

| | 1, | C1, | 2, | C2, | C3, | C4 |
|---|---|---|---|---|---|---|
| EVA #1 | 40 | | 100 | 40 | | |
| LLDPE | 60 | 100 | | 60 | 100 | 100 |
| Graft Copol 1 | 30 | 30 | 30 | | 40 | |
| Graft Copol 2 | 10 | 10 | 10 | | | |
| EPDM 1 | | | | | | 40 |
| $Mg(OH)_2$ | 125 | 125 | 125 | 89 | 125 | 125 |
| Antioxidant | 1 | 1 | 1 | 0.7 | 1 | 1 |
| Tensile Str, PSI | 1780 | 1925 | 1835 | 1437 | 1812 | 1651 |
| Tensile Str, MPa | 12.27 | 13.27 | 12.65 | 9.91 | 12.49 | 11.38 |
| % Retention** | 96 | 98 | 98 | 96 | 102 | 90 |
| % Elong. at Break | 376 | 414 | 503 | 570 | 307 | 677 |
| % Retention** | 98 | 89 | 92 | 48 | 88 | 101 |
| Brittleness: Failures/10 @ | | | | | | |
| −45° C. | 1 | * | * | * | * | * |
| −60° C. | 5 | | | | | |
| Limiting $O_2$ Index | 31 | 24 | 24 | 26 | 25 | 24 |

*Values uncertain - machine was not working properly.
**% Retention means retention of the property after aging the sample at 100° C. for 48 hours in a circulating air oven.

TABLE 2

| Example: | 3, | 4 |
|---|---|---|
| EVA #1 | 100 | 100 |
| Graft Copolymer 1 | 30 | 30 |
| Graft Copolymer 2 | 10 | 10 |
| $Mg(OH)_2$ | 145 | 135 |
| Antioxidant | 1 | 1 |
| Tensile Str, PSI | 1589 | 1559 |
| Tensile Str, MPa | 10.96 | 10.75 |

TABLE 2-continued

| Example: | 3, | 4 |
|---|---|---|
| % Retention | 93 | 97 |
| % Elong. @ Break | 439 | 422 |
| % Retention | 80 | 87 |
| Brittleness: Failures/10 @ | | |
| −45° C. | 1 | 2 |
| −60° C. | 10 | 10 |
| Limiting O₂ Index | 32 | 29 |

TABLE 3

|  | 5, | 6, | 7*, | 8, | 9 |
|---|---|---|---|---|---|
| EVA #1 | 40 | 40 | | | |
| EVA #2 | | | 40 | 40 | |
| EVA #3 | | | | | 40 |
| MDPE | 60 | | 60 | | 60 |
| LLDPE | | 60 | | 60 | |
| Graft Co-polymer 1 | 30 | 30 | 30 | 30 | 30 |
| Graft Co-polymer 2 | 10 | 10 | 10 | 10 | 10 |
| Mg(OH)₂ | 110 | 110 | 110 | 110 | 110 |
| Antioxidant | 1 | 1 | 1 | 1 | 1 |
| Tensile Str, PSI | 2123 | 2071 | 1973 | 2386 | 1834 |
| Tensile Str, MPa | 14.64 | 14.28 | 13.60 | 16.45 | 12.65 |
| % Retention | 105 | 98 | 105 | 106 | 103 |
| % Elong. @ Break | 325 | 440 | 364 | 308 | 290 |
| % Retention | 76 | 92 | 87 | 88 | 70 |
| Brittleness: Failures/10 @ | | | | | |
| −45° C. | 1 | 0 | 0 | 0 | 0 |
| −60° C. | 0 | 0 | 2 | 0 | 4 |
| Limiting O₂ Index | | | 27 | 26 | |

*Duplications of this Example resulted in Elongation to Break values of 347, 280, 387, 352, 425, 260. Other property values were in the range of those of Example 6.

TABLE 4

|  | 10, | 11, | 12, | 13 |
|---|---|---|---|---|
| EVA #2 | 40 | 40 | 40 | 40 |
| MDPE | 60 | 60 | | |
| LLDPE | | | 60 | 60 |
| Graft Co-polymer 1 | 30 | 40 | 30 | 40 |
| Graft Co-polymer 2 | 10 | | 10 | |
| Mg(OH)₂ | 110 | 110 | 110 | 110 |
| Antioxidant | 1 | 1 | 1 | 1 |
| Tensile Str, PSI | 2017 | 2223 | 2195 | 2120 |
| Tensile Str, MPa | 13.91 | 15.33 | 15.13 | 14.62 |
| % Retention | 102 | 110 | 100 | 121 |
| % Elong. @ Break | 387 | 229 | 407 | 205 |
| % Retention | 83 | 90 | 86 | 114 |
| Brittleness: Failures/10 @ | | | | |
| −45° C. | 1 | 0 | 0 | 0 |
| −60° C. | 4 | 1 | 0 | 0 |
| Limiting O₂ Index | 26 | | 26 | |

TABLE 5

|  | 14 | 15, | 16 | 17 | 18, | C5 | 19, | 20 |
|---|---|---|---|---|---|---|---|---|
| EVA #1 | 40 | 40 | 40 | 40 | 40 | 40 | 30 | |
| EVA #2 | | | | | | | | 40 |
| LLDPE | 60 | 60 | 60 | 60 | 60 | 60 | 70 | |
| MDPE | | | | | | | | 60 |
| Graft Co-polymer 1 | 30 | 20 | 15 | 10 | | | 10 | 10 |
| Graft Co-polymer 2 | 10 | 10 | 10 | 10 | 10 | | | |
| EPDM 1 | | 10 | 15 | 20 | 30 | 40 | 20 | 10 |
| Mg(OH)₂ | 110 | 110 | 110 | 110 | 110 | 110 | 130 | 110 |
| Antioxidant | 1 | 1 | 1 | 1 | 1 | 1 | 1 | 1 |
| Tensile Str, PSI | 1992 | 1992 | 1788 | 1977 | 2076 | 1853 | 1724 | 1715 |
| Tensile Str, MPa | 13.73 | 13.73 | 12.33 | 13.63 | 14.31 | | 11.89 | 11.83 |
| % Retention | 104 | 96 | 108 | 99 | 96 | 87 | 90 | |
| % Elong. @ Break | 453 | 567 | 535 | 664 | 764 | 754 | 643 | 506 |
| % Retention | 92 | 85 | 105 | 97 | 96 | 93 | 90 | |
| Brittleness: Failures/10 @ | | | | | | | | |
| −45° C. | 1 | 0 | 0 | 3 | 8 | 10 | 9 | 6 |
| −60° C. | 4 | 7 | 7 | 10 | 10 | 10 | 10 | 10 |

TABLE 6

| Example: | 21, | 22, | 23, | 24 |
|---|---|---|---|---|
| EVA #1 | 40 | 30 | 40 | 40 |
| EVA #2 | | | | |
| EEA | | | | |
| LLDPE | 60 | 70 | 60 | 60 |
| MDPE | | | | |
| Graft Co-polymer 1 | 30 | 30 | 30 | 30 |
| Graft Co-polymer 2 | | 10 | | 10 |
| MoO₃ | | | | |
| Melamine Resin | 5 | | | |
| Mg(OH)₂ | 125 | 130 | 140 | 130 |
| Antioxidant | 1 | 1 | 1 | 1 |
| Tensile Str, PSI | 1848 | 1939 | 1805 | 1806 |
| Tensile Str, MPa | 12.74 | 13.37 | 12.45 | 12.45 |
| % Retention | 99 | 97 | 95 | |
| % Elong. @ Break | 495 | 437 | 354 | 372 |
| % Retention | 95 | 83 | 90 | |
| Brittleness: Failures/10 @ | | | | |
| −45° C. | 1 | 0 | * | 1 |
| −60° C. | 4 | 6 | * | 9 |
| Limiting O₂ Index | 30 | L28 | 29 | 29 |

| Example: | 25, | 26, | 27 | 28, | 29 |
|---|---|---|---|---|---|
| EVA #1 | | 40 | | | |
| EVA #2 | | | 40 | 40 | 40 |
| EEA | 60 | | | | |
| MDPE | | | 60 | 60 | |
| LLDPE | 40 | 60 | | | 60 |
| Graft Co-polymer 1 | 30 | 30 | 30 | 30 | 30 |
| Graft Co-polymer 2 | 10 | 10 | | 10 | 10 |
| MoO₃ | | | | | 10 |
| Melamine Resin | | 5 | | | |
| Mg(OH)₂ | 110 | 110 | | 55 | 124 |
| Alumina Trihydrate | | | 110 | 55 | 20 |
| Antioxidant | 1 | 1 | 1 | | 1 |
| Tensile Str, PSI | 1773 | 1872 | 1660 | 2143 | 2218 |
| Tensile Str, MPa | 12.22 | 12.91 | 11.45 | 14.78 | 15.30 |
| % Retention | 95 | 104 | | 113 | 106 |
| % Elong. @ Break | 321 | 411 | 356 | 308 | 195 |
| % Retention | 72 | 82 | | 89 | 89 |
| Brittleness: Failures/10 @ | | | | | |
| −45° C. | 1 | 0 | 0 | 1 | 2 |
| −60° C. | 1 | 0 | 2 | 0 | 5 |
| Limiting O₂ Index | L28 | 29 | | | 28 |

TABLE 6-continued

| Index |
|---|
| *Values uncertain - machine was not working properly. |

TABLE 7

| Example: | 30, | 31 | 32, | 33** | 34, | 35, | 36, | 37, | 38 | 39, | 40 |
|---|---|---|---|---|---|---|---|---|---|---|---|
| EVA #1 | 40 | | 30 | 40 | 40 | 30 | 40 | 40 | 40 | 30 | 40 |
| EEA | | 40 | | | | | | | | | |
| LLDPE | 60 | 60 | 70 | 60 | 60 | 70 | 60 | 60 | 60 | 70 | 60 |
| Graft Copol 1 | 15 | 20 | 10 | 20 | 30 | 15 | 20 | 20 | 10 | 20 | 10 |
| Graft Copol 2 | 10 | 10 | 15 | 15 | 10 | 15 | 10 | 10 | 10 | 15 | 15 |
| EPDM 1 | 15 | 10 | 20 | 15 | 10 | 20 | 10 | 10 | 20 | 15 | 20 |
| Mg(OH)$_2$ | 135 | 135 | 145 | 150 | 150 | 150 | 110 | 154 | 135 | 150 | 145 |
| Antioxidant | 1 | 1 | 1 | 1 | 1 | 1 | 1 | 1 | 1 | 1 | 1 |
| Tensile Str, PSI | 1834 | 1780 | 1800 | 1772 | 1762 | 1511 | 1979 | 1403 | 1700 | 1646 | 1658 |
| Tensile Str, MPa | 12.65 | 12.27 | 12.41 | 12.22 | 12.15 | 10.42 | 13.65 | 9.67 | 11.72 | 11.35 | 11.43 |
| % Retention | 93 | 90 | 93 | | 94 | | 104 | 112 | 95 | 94 | |
| % Elong. @ Break | 552 | 435 | 599 | 482 | 418 | 446 | 550 | 309 | 599 | 349 | 549 |
| % Retention | 94 | 77 | 89 | | 85 | | 97 | 123 | 91 | 103 | |
| Brittleness: Failures/10 @ | | | | | | | | | | | |
| −45° C. | 1 | 2 | 8 | 2 | * | * | 0 | 10 | 5 | 1 | 7 |
| −60° C. | 10 | 8 | 9 | 10 | | | 4 | 10 | 10 | 8 | 10 |
| Limiting O$_2$ Index | 30 | L28 | 29 | 29 | 30 | 31 | L28 | L28 | L28 | L28 | L28 |

*Brittleness Brittleness not accurately recorded due to machine malfunction.
**When When graft copolymer 2 is replaced with an ethylene/methacrylic acid copolymer of MI 3, good results are obtained.

TABLE 8

| Example: | 41, | 42, | 43, | 44, | 45, | 46, | 47 |
|---|---|---|---|---|---|---|---|
| EVA #1 | 40 | 40 | 40 | 40 | 50 | 40 | 30 |
| LLDPE | 60 | 60 | 60 | 60 | 50 | 60 | 70 |
| Graft Copolymer 1 | 10 | 10 | 20 | 20 | 15 | 15 | 35 |
| Graft Copolymer 2 | 10 | 10 | 10 | 10 | | 10 | |
| Graft Copolymer 3 | | | | | 10 | | |
| Ionomer 1 | 3 | | 3 | 3 | 3 | 3 | 5 |
| Ionomer 2 | | 3 | | | | | |
| EPDM 1 | 20 | 20 | 10 | 10 | 15 | 15 | 10 |
| Melamine Resin | | | | | | | |
| MoO$_3$ | 4 | 4 | | 4 | 4 | 4 | 4 |
| Mg(OH)$_2$ | 135 | 135 | 135 | 135 | 135 | 135 | 100 |
| Antioxidant | 1 | 1 | 1 | 1 | 1 | 1 | 0.2 |
| Carbon Black | | | | | | | 2 |
| Tensile Str, PSI | 1624 | 1496 | 1844 | 1635 | 1424 | 1589 | 2400 |
| Tensile Str, MPa | 11.20 | 10.31 | 12.71 | 11.27 | 9.82 | 10.96 | 16.55 |
| % Retention | 100 | 103 | 90 | 99 | | | |
| % Elong. @ Break | 502 | 527 | 503 | 375 | 434 | 502 | 392 |
| % Retention | 106 | 79 | 87 | 99 | | | |
| Brittleness: Failures/10 @ | | | | | | | |
| −45° C. | 3 | | 1 | 2 | | | 0 |
| −60° C. | 10 | | 7 | 10 | | | 1 |
| Limiting O$_2$ Index | 31 | 30 | 29 | 30 | 29 | 29 | |

TABLE 9

| Example: | 48, | 49, | 50 | 51 | 52, | 53, | 54 |
|---|---|---|---|---|---|---|---|
| EVA #1 | 40 | | | 40 | | | |
| EVA #2 | | 40 | 40 | | 40 | 40 | 40 |
| MDPE | | | 60 | | 60 | 60 | 60 |
| LLDPE | 60 | 60 | | 60 | | | |
| Graft Copolymer 1 | 20 | 30 | 30 | 30 | 20 | 20 | 20 |
| Graft Copolymer 2 | | 10 | 10 | | 20 | 20 | 20 |
| Ionomer 1 | 5 | 5 | | 3 | | | |
| Ionomer 2 | | | 5 | | 4 | 3 | 10 |
| MoO$_3$ | | | | 4 | | | |
| Mg(OH)$_2$ | 110 | 152 | 110 | 145 | 110 | 110 | 110 |
| Antioxidant | 1 | 1.4 | 1 | 1 | 1 | | |
| Carbon Black | 2 | 2.8 | | | | | |
| Tensile Str, PSI | 2560 | 2700 | 1870 | 2088 | 1908 | 2149 | 2175 |
| Tensile Str, MPa | 17.65 | 18.62 | 12.89 | 14.40 | 13.16 | 14.82 | 15.00 |
| % Retention | | | | | 106 | 99 | 101 |
| % Elong. @ Break | 223 | 199 | 395 | 193 | 287 | 415 | 337 |
| % Retention | | | | | 90 | 59 | 77 |
| Brittleness: Failures/10 @ | | | | | | | |
| −45° C. | 0 | 0 | 1 | 0 | 2 | 0 | 1 |
| −60° C. | 0 | 0 | 8 | 3 | 7 | 0 | 1 |
| LOI | | | | 32 | | | |

TABLE 10

| Example: | C6, | C7, | C8, | C9 |
|---|---|---|---|---|
| EVA #2 | | | 40 | 33 |
| EVA #3 | 40 | | | |
| EEA | | | | |
| E/nBA | | 40 | | |
| MDPE | 60 | 60 | 60 | |
| LLDPE | | | | 67 |
| EPDM 2 | | | 20 | 11 |
| Mg(OH)$_2$ | 110 | 110 | 110 | 110 |
| Antioxidant | 1 | 1 | 1 | 1 |
| Carbon Black | 2 | 2 | 2 | |
| Tensile Str, PSI | 2440 | 1600 | 1520 | 1510 |
| Tensile Str, MPa | 16.82 | 11.03 | 10.48 | 10.41 |
| % Retention | | | | |
| % Elong. @ Break | 6 | 8 | 514 | 72 |
| % Retention | | | | |
| Brittleness: Failures/10 @ | | | | |
| −45° C. | | | 10 | 10 |
| −60° C. | | | 10 | 10 |

TABLE 10-continued

| Example: | C6, | C7, | C8, | C9 |
| --- | --- | --- | --- | --- |
| Limiting O$_2$ Index | | | | |

TABLE 11

| Example: | C10, | C11, | C12 |
| --- | --- | --- | --- |
| MDPE | 60 | 50 | |
| HDPE | | | 60 |
| Graft Copol 1 | 10 | 10 | |
| EPDM 1 | | | 40 |
| EPDM 2 | 30 | 40 | |
| Mg(OH)$_2$ | 110 | 110 | 110 |
| Antioxidant | 1 | 1 | 1 |
| Carbon Black | 2 | 2 | 2 |
| Tensile Str, PSI | 1480 | 1210 | 1500 |
| Tensile Str, MPa | 10.20 | 8.34 | 10.34 |
| % Elong. @ Break | 199 | 394 | 8 |
| Brittleness: Failures/10 @ −45° C. | 10 | 10 | |

TABLE 12

| Example: | 55, | 56, | 57 |
| --- | --- | --- | --- |
| EVA #1 | 40 | 40 | 40 |
| LLDPE | 60 | 60 | 60 |
| Graft Co-Polymer 1 | 20 | 20 | 20 |
| Graft Copolymer of Maleic Anhydride (1.1 wt %) on EVA (18 wt % VA) MI 2.6 | 15 | — | — |
| Graft Copolymer of Maleic Anhydride (0.9 wt %) on EVA (9 wt % EVA) MI 0.8 | — | 15 | — |
| E/MAA (9%), MI 3 | — | — | 15 |
| Antioxidant | 1 | 1 | 1 |
| Carbon Black | — | — | 3.4 |
| Mg(OH)$_2$ | 135 | 150 | 150 |
| Tensile Str. PSI | 1688.0 | 1750.0 | 1846.0 |
| Tensile Str. MPa | 11.6 | 12.1 | 12.7 |
| % Elong. @ Break | 405.0 | 475.0 | 233.0 |
| Brittleness: | | | |
| Failures/10 @ −45 C. | | | 0.0 |
| Failures/10 @ −60 C. | | | 0.0 |
| Limiting O$_2$ Index | 29.0 | 30.0 | 27.0 |

We claim:

1. A thermoplastic ethylene polymer composition comprising:
   (a) 20–100 parts of an ethylene polymer matrix comprising at least one thermoplastic ethylene copolymer of ethylene and at least one comonomer selected from vinyl acetate, esters and of methacrylic acid or esters of acrylic acid;
   (b) 10–80 parts of at least one copolymer selected from the class consisting of (i) an ethylene/proylene/diene copolymer grafted with 0.1 to 5 weight % anhydride functionality, (ii) at least one polyolefin grafted with 0.1 to 5 weight % anhydride functionality, or (iii) a mixture of both;
   (c) 75–130 parts per 100 parts of polymeric components present of magnesium hydroxide or aluminum trihydrate, or a mixture of both; and
   (d) 0–80 parts of polyethylene; provided that the combined parts of components (a) and (d) is at least 80 parts.

2. A composition according to claim 1 wherein the polyethylene is medium density polyethylene and/or linear low density polyethylene.

3. A composition according to claim 1 or 2 which also contains 3–20 parts of at least one ionomeric copolymer of ethylene and at least one alpha,beta-ethylenically unsaturated carboxylic acid of 3–6 carbons partially neutralized with metal cations.

4. A composition according to claim 1 or 2 which also contains up to 50 parts of an ethylene/propylene copolymer, or an ethylene/propylene/diene copolymer.

5. The composition according to claim 1 or 2 wherein the copolymer defined in part (a) is an ethylene/vinyl acetate copolymer.

6. A composition according to claim 1 which additionally contains 10–40 parts of a copolymer selected from the class consisting of a copolymer of ethylene and either acrylic acid or methacrylic acid,
   a copolymer of ethylene/vinyl acetate grafted with anhydride functionality, and
   a copolymer of ethylene and acrylic or methacrylic acid esters of saturated aliphatic alcohols grafted with anhydride functionality.

* * * * *